United States Patent
Minatoya et al.

(10) Patent No.: US 10,378,468 B2
(45) Date of Patent: Aug. 13, 2019

(54) MISFIRE DETECTING APPARATUS FOR INTERNAL COMBUSTION ENGINE

(75) Inventors: Keisuke Minatoya, Wako (JP); Atsushi Izumiura, Wako (JP); Tadayoshi Sasaki, Wako (JP); Shigetaka Kuroda, Tokyo (JP); Mahito Shikama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2179 days.

(21) Appl. No.: 13/410,337

(22) Filed: Mar. 2, 2012

(65) Prior Publication Data
US 2012/0232774 A1 Sep. 13, 2012

(30) Foreign Application Priority Data

Mar. 9, 2011 (JP) .................................. 2011-50945
Jan. 12, 2012 (JP) .................................. 2012-3837

(51) Int. Cl.
*G01M 15/04* (2006.01)
*F02D 41/14* (2006.01)
(Continued)

(52) U.S. Cl.
CPC ......... *F02D 41/1498* (2013.01); *G01M 15/11* (2013.01); *F02D 2200/1015* (2013.01); *F02P 5/1502* (2013.01)

(58) Field of Classification Search
CPC ............ G01M 15/11; F02D 2200/1015; F02D 41/0087; F02D 41/1498; F02D 41/22;
(Continued)

(56) References Cited

U.S. PATENT DOCUMENTS 5,144,927 A * 9/1992 Denz ........................ 73/114.03
5,231,869 A * 8/1993 Klenk et al. ............... 73/114.08
(Continued)

FOREIGN PATENT DOCUMENTS

JP    04-171249 A    6/1992
JP    2006-266253    10/2006
(Continued)

OTHER PUBLICATIONS

Office Action dated Aug. 4, 2015, issued in corresponding Japanese Patent Application No. 2012-003837.
(Continued)

*Primary Examiner* — Hai H Huynh
*Assistant Examiner* — Gonzalo Laguarda
(74) *Attorney, Agent, or Firm* — Squire Patton Boggs (US) LLP

(57) ABSTRACT

A misfire detecting apparatus for an internal combustion engine is provided. The engine has an output shaft connected via a torsion element to an input shaft of a transmission mechanism. A transmission rotational speed parameter indicative of a rotational speed of the input shaft is detected. A modified engine rotational speed parameter is calculated by modifying the detected engine rotational speed parameter based on the transmission rotational speed parameter, an engine rotation moment on the input side of the torsion element, and a transmission rotation moment on the output side of the torsion element. An average change amount of the modified rotational speed parameter, and an inertia speed changing component, are calculated. Further, a corrected rotational speed parameter is calculated by correcting the modified rotational speed parameter according to the average change amount and the inertia speed changing component. A relative speed parameter is calculated based on the corrected rotational speed parameter, and a determination (Continued)

parameter is calculated by integrating the relative speed parameter. The misfire determination is performed based on the determination parameter.

3 Claims, 9 Drawing Sheets

(51) Int. Cl.
*G01M 15/11* (2006.01)
*F02P 5/15* (2006.01)

(58) Field of Classification Search
CPC ...... B60W 20/00; B60W 20/40; B60W 10/06; B60W 10/08; Y10S 903/902
USPC ............ 701/22, 103, 105, 111; 123/198 DB, 123/481; 702/183; 180/65.265; 903/902; 477/5; 73/114.04
See application file for complete search history.

(56) References Cited

U.S. PATENT DOCUMENTS

| | | | |
|---|---|---|---|
| 5,377,537 A | 1/1995 | James | |
| 5,440,922 A | 8/1995 | Ichikawa | |
| 5,539,644 A | 7/1996 | Ichikawa et al. | |
| 5,699,252 A * | 12/1997 | Citron et al. | 701/111 |
| 6,298,717 B1 * | 10/2001 | Nishimura | 73/114.04 |
| 6,345,499 B1 | 2/2002 | Nishimura et al. | |
| 6,520,159 B2 * | 2/2003 | White et al. | 123/481 |
| 6,600,988 B1 * | 7/2003 | Da | B60K 28/16 123/336 |
| 7,292,933 B2 * | 11/2007 | Christensen | 701/111 |
| 7,480,591 B2 | 1/2009 | Shikama et al. | |
| 7,536,902 B2 | 5/2009 | Tsukamoto et al. | |
| 7,614,290 B2 | 11/2009 | Shikama et al. | |
| 7,877,192 B2 | 1/2011 | Shikama et al. | |
| 2002/0014113 A1 | 2/2002 | Takaku et al. | |
| 2002/0056315 A1 | 5/2002 | Takaku et al. | |
| 2004/0237635 A1 | 12/2004 | Ohsaki et al. | |
| 2007/0157713 A1 | 7/2007 | Tsukamoto et al. | |
| 2008/0098806 A1 | 5/2008 | Shikama et al. | |
| 2008/0103681 A1 | 5/2008 | Shikama et al. | |
| 2010/0294027 A1 | 11/2010 | Kondo et al. | |

FOREIGN PATENT DOCUMENTS

| | | |
|---|---|---|
| JP | 2007-198368 A | 8/2007 |
| JP | 2008-057492 | 3/2008 |
| JP | 2008-111354 A | 5/2008 |
| JP | 2008-215338 A | 9/2008 |
| JP | 2008-248877 A | 10/2008 |
| JP | 2009-191709 A | 8/2009 |
| JP | 2009-191710 A | 8/2009 |
| JP | 2010-024903 A | 2/2010 |

OTHER PUBLICATIONS

International Search Report dated Dec. 28, 2010, issued in corresponding International Patent Application No. PCT/JP2010/070705.
Non-Final Office Action issued in correponding U.S. Appl. No. 13/510,968, dated Dec. 18, 2014.
Final Office Action issued in corresponding U.S. Appl. No. 13/510,968, dated Apr. 1, 2015.

* cited by examiner

MISFIRE DETECTING APPARATUS FOR INTERNAL COMBUSTION ENGINE

BACKGROUND OF THE INVENTION

Field of the Invention

The present invention relates to a misfire detecting apparatus for an internal combustion engine, and particularly to the apparatus for determining a misfire based on a rotational speed parameter indicative of a rotational speed of the engine of which the output shaft is connected via a torsion element to an input shaft of a transmission mechanism.

Description of the Related Art

Japanese Patent Laid-open No. 2008-57492 (JP-'492) discloses an apparatus for determining a misfire based on the rotational speed parameter indicative of a rotational speed of the engine of which the output shaft is connected via a damper (torsion element) to a power transmission mechanism. According to this apparatus, a torque component transmitted from the mechanism on the output side of the damper is calculated, a correcting speed component which affects the rotational speed of the engine output shaft is calculated according to the torque component, and a determination rotational speed is calculated by subtracting the correcting speed component from the detected rotational speed. By performing the misfire determination based on the determination rotational speed, the misfire determination can be performed without influence of the damper.

Japanese Patent Laid-open No. 2006-266253 (JP-'253) discloses an apparatus which performs a misfire determination during the warm-up operation of the engine according to a rotation change parameter indicative of changes in the rotational speed of the engine. According to this apparatus, a rotation change is calculated corresponding to the ignition timing of each cylinder, and a rotation change difference N×d360 and a rotation change difference N×d720 are further calculated. The rotation change difference N×d360 is a difference between the present rotation change and the rotation change at 360-degree crank angle before, and the rotation change difference N×d720 is a difference between the present rotation change and the rotation change at 720-degree crank angle before. The misfire determination is performed based on the rotation change difference N×d360 and the rotation change difference N×d720.

The rotational speed of the engine contains an inertia speed changing component which is a speed changing component inevitably generated with the engine rotation. The inertia speed changing component changes corresponding to a position of the piston in each cylinder. According to the apparatus shown in JP-'253, the rotation change is calculated corresponding to the ignition timing, but the inertia speed changing component is not taken into account in this rotation change calculation. Accordingly, if the calculation timing of the rotation change varies due to a change in the ignition timing, influence of the inertia speed changing component changes, which may deteriorate calculation accuracy of the rotation change. Further, the apparatus of JP-'253 determines a misfire during the warming-up operation of the engine. Consequently, the accelerating operating condition or the decelerating operating condition of the engine are not taken into consideration.

According to the apparatus of JP-'492, influence of the damper can be eliminated. However, influence of the inertia speed changing component and the ignition timing is not taken into consideration at all. Further, the calculation method of the rotational speed for the misfire determination shown in JP-'492 uses an integrating (accumulating) calculation. Therefore, a simpler method is desired.

SUMMARY OF THE INVENTION

The present invention was made contemplating the above described points, and an objective of the present invention is to provide a misfire detecting apparatus for an internal combustion engine, which can accurately perform the misfire determination in the engine of which the output shaft is connected via a torsion element to an input shaft of the transmission mechanism.

To attain the above objective, the present invention provides a misfire detecting apparatus for an internal combustion engine (1), having engine rotational speed parameter detecting means for detecting an engine rotational speed parameter (OMGCRK) indicative of a rotational speed of the engine of which the output shaft (8) is connected via a torsion element (21) to an input shaft (23) of a transmission mechanism (24), and detecting a misfire of the engine based on the detected engine rotational speed parameter (OMGCRK). The misfire detecting apparatus includes transmission rotational speed parameter detecting means, modifying means, correcting means, relative speed parameter calculating means, determination parameter calculating means, and determining means. The transmission rotational speed parameter detecting means detects a transmission rotational speed parameter (OMGMAIN) indicative of a rotational speed of the input shaft (23) of the transmission mechanism. The modifying means calculates a modified engine rotational speed parameter (OMG) by modifying the detected engine rotational speed parameter (OMGCRK) based on the transmission rotational speed parameter (OMGMAIN), an engine rotation moment (ICRK) on the input side of the torsion element (21), and a transmission rotation moment (IMAIN) on the output side of the torsion element (21). The correcting means calculates, at predetermined crank angles, an average change amount (DELTAOMGTDCA/4π) of the modified rotational speed parameter (OMG) in a predetermined period, and an inertia speed changing component (OMGI). The inertia speed changing component (OMGI) is a speed changing component generated with rotation of the engine. The correcting means further calculates a corrected rotational speed parameter (OMGMA) by correcting the modified rotational speed parameter (OMG) according to the average change amount (DELTAOMGTDCA/4π) and the inertia speed changing component (OMGI). The relative speed parameter calculating means calculates a relative speed parameter (OMGREFMA) according to a difference between a reference value (OMGMATDC) and the corrected rotational speed parameter (OMGMA). The reference value (OMGMATDC) is the corrected rotational speed parameter corresponding to the rotational speed parameter (OMGCRK) which is detected at a reference timing (IGOFST) at which a piston of a cylinder, which is subjected to the misfire determination, is positioned in the vicinity of the compression top dead center. The determination parameter calculating means calculates a determination parameter (MFPARAMA) by integrating the relative speed parameter (OMGREFMA) for an integration period (TINTG) corresponding to 720/N degrees of the crank angle ("N" is a number of cylinders of the engine). The determining means performs a misfire determination based on the determination parameter (MFPARAMA). The reference timing (IGOFST)

and a start timing (IGOFST) of the integration period (TINTG) are set according to the ignition timing (IGLOG) of the engine.

With this configuration, the modified engine rotational speed parameter is calculated by modifying the detected engine rotational speed parameter based on the transmission rotational speed parameter, the engine rotation moment on the input side of the torsion element, and the transmission rotation moment on the output side of the torsion element, and the corrected rotational speed parameter is calculated by correcting the modified rotational speed parameter according to the average change amount of the modified engine rotational speed in the predetermined period and the inertia speed changing component. The relative speed parameter is calculated according to a difference between the corrected rotational speed parameter and the reference value which is the corrected rotational speed parameter corresponding to the rotational speed parameter detected at the reference timing at which the piston of the cylinder, which is subjected to the misfire determination, is positioned in the vicinity of the compression top dead center. Further, the determination parameter is calculated by integrating the relative speed parameter for the integration period of 720/N degrees of the crank angle. In addition, the reference timing and the start timing of the integration period are set according to the ignition timing.

If the reference timing and the start timing of the integration period are set to a constant timing regardless of the ignition timing, the value of the determination parameter upon occurrence of misfire approaches a value indicative of the normal combustion when the ignition timing is changed in the retarding direction. Accordingly, possibility of erroneous determination becomes higher. Therefore, setting the reference timing and the start timing of the integration period according to the ignition timing makes it possible to accurately perform the misfire determination regardless of the ignition timing. Further, by using the modified engine rotational speed parameter, the determination can accurately be performed removing the influence of the torsion element.

Preferably, the modifying means calculates the modified engine rotational speed parameter (OMG) using the following equations (A) and (B):

$$OMG = KRI \times OMGCRK + (1-KRI) \times OMGMAIN \quad (A)$$

$$KRI = ICRK/(ICRK + IMAIN) \quad (B)$$

where "OMG" is the modified engine rotational speed parameter, "OMGCRK" is the detected engine rotational speed parameter, "OMGMAIN" is the detected transmission rotational speed parameter, "KRI" is an inertia moment ratio given by the equation (B), "ICRK" is the engine rotation moment, and "IMAIN" is the transmission rotation moment.

With this configuration, the modified rotational speed parameter is calculated with the equation (A) including the inertia moment ratio KRI, which makes it possible to obtain an engine rotational speed parameter from which the influence of the torsion element is eliminated, with a comparatively simple calculation.

Alternatively, the modifying means calculates the modified engine rotational speed parameter (OMG) using the following equation (C):

$$OMG = OMGCRK + (IMAIN/ICRK) \times OMGMAINAC \quad (C)$$

where "OMG" is the modified engine rotational speed parameter, "OMGCRK" is the detected engine rotational speed parameter, "OMGMAINAC" is a changing component parameter indicative of a changing component contained in the detected transmission rotational speed parameter, "ICRK" is the engine rotation moment, and "IMAIN" is the transmission rotation moment.

With this configuration, the modified rotational speed parameter is calculated with the equation (C) including the ratio (IMAIN/ICRK) between the engine rotation moment and the transmission rotation moment, which makes it possible to obtain an engine rotational speed parameter from which the influence of the torsion element is eliminated, with a comparatively simple calculation like with the equation (A).

DETAILED DESCRIPTION OF THE PREFERRED EMBODIMENTS

Preferred embodiments of the present invention will now be described with reference to the drawings.

Figure 1:
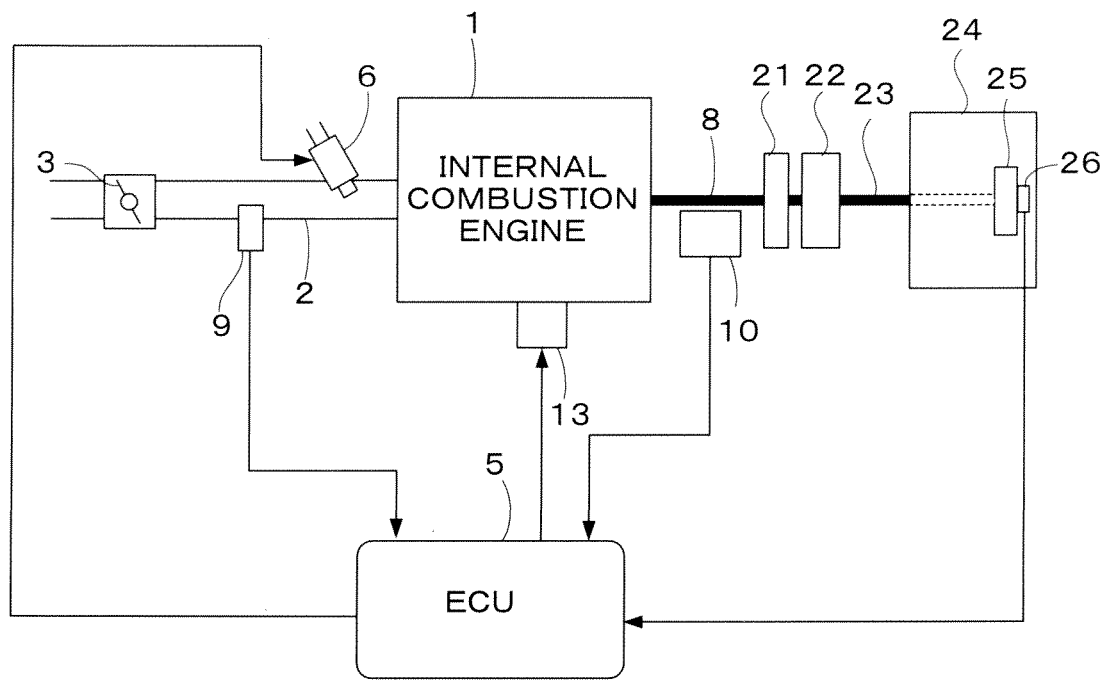
FIG. 1 shows a configuration of an internal combustion engine and a control system therefor according to one embodiment of the present invention.

FIG. 1 is a schematic diagram of an internal combustion engine and a control system therefor according to one embodiment of the present invention. The internal combustion engine 1 (hereinafter referred to as "engine") has six cylinders and is provided with an intake pipe 2 and an exhaust pipe 5. The intake pipe 2 is provided with a throttle valve 3.

A fuel injection valve 6 is provided for each cylinder at a position slightly upstream of an intake valve (not shown) in the intake pipe 2 and between the engine 1 and the throttle valve 3. Each fuel injection valve 6 is connected to a fuel pump (not shown) and electrically connected to an electronic control unit 20 (hereinafter referred to as "ECU 5"). A valve opening period of the fuel injection valve 6 is controlled by a control signal from the ECU 5.

An ignition plug 13 of each cylinder of the engine 1 is connected to the ECU 5, and the ignition timing is controlled by a ignition signal from the ECU 5.

An intake pressure (PBA) sensor 9 is provided immediately downstream of the throttle valve 3. The intake pressure sensor 9 detects a pressure in the intake pipe 2 and the detection signal is supplied to the ECU 5.

A crank angle position sensor 10 for detecting a rotational angle of the crankshaft 8 of the engine 1 is connected to the ECU 5. A signal corresponding to the detected rotational angle of the crankshaft 8 is supplied to the ECU 5. The crank angle position sensor 10 includes a cylinder discrimination sensor which outputs a pulse (hereinafter referred to as "CYL pulse") at a predetermined angle position of a specific cylinder of the engine 1. The crank angle position sensor 10 also includes a TDC sensor, which outputs a TDC pulse at a crank angle position of a predetermined crank angle before a top dead center (TDC) starting an intake stroke in each cylinder (i.e., at every 120-degree crank angle in the case of a six-cylinder engine), and a CRK sensor for generating one pulse (hereinafter referred to as "CRK pulse") with a crank angle period (e.g., period of 6 degrees, shorter than the period of generation of the TDC pulse). The CYL pulse, the TDC pulse, and the CRK pulse are supplied to the ECU 5. The CYL pulse, the TDC pulse, and the CRK pulse are used to control the various timings, such as the fuel injection timing and the ignition timing, and to detect an engine rotational speed NE. Further, the ECU 5 detects a misfire occurring in the engine 1 based on a time interval of the generated CRK pulse (hereinafter referred to as "time period parameter CRME").

The CRK sensor has a pulse wheel and a pickup coil. The pulse wheel is fixed on the crankshaft and has teeth formed on the outer periphery at fixed angular intervals. The pickup coil is mounted facing the pulse wheel. An alternate current signal is generated in the pickup coil with rotation of the pulse wheel, and the alternate current signal is converted to the CRK pulse so that the CRK sensor outputs the CRK pulse.

The crankshaft 8 of the engine 1 is connected through a torsion element and a clutch 22 to a main shaft (input shaft) 23 of a transmission mechanism 24. As the torsion element 21, a dual-mass flywheel, a clutch damper (a torsion damper disposed between the clutch disk of the clutch 22 and the shaft), and the like are used, for example. The transmission mechanism 24 is provided with a motor 25 so that the motor 25 can directly rotate the main shaft 23, and the motor 25 has a resolver 26 for detecting a rotational speed of the motor 25. The detection signal of the resolver 26 is supplied to a motor control electronic control unit (not shown) and also to the ECU 5. The CPU in the ECU 5 calculates a rotational speed OMGMAIN of the main shaft 23 (hereinafter referred to as "transmission rotational speed") based on the detection signal of the resolver 26.

The ECU 5 includes an input circuit, a central processing unit (hereinafter referred to as "CPU"), a memory circuit, and an output circuit. The input circuit performs numerous functions, including shaping the waveforms of input signals from the various sensors; correcting the voltage levels of the input signals to a predetermined level; and converting analog signal values into digital signal values. The memory circuit preliminarily stores various operating programs to be executed by the CPU and stores results of the computations, and the like, by the CPU. The output circuit supplies control signals to the fuel injection valve 6, the ignition plug 13, and the like. The CPU in the ECU 5 performs the misfire detection described below.

The basic configuration of the misfire determination method in this embodiment is the same as that of the method described in Japanese Patent Laid-open No. 2007-198368. In this embodiment, the following improvements are added. Firstly, a modified rotational speed OMG is calculated by modifying a detected engine rotational speed OMGCRK which is calculated from the detected time period parameter CRME, and the misfire determination is performed based on the modified rotational speed OMG. Secondly, the detection timing (reference timing) of a reference engine rotational speed (reference value) and the start timing of the integration period for integrating a relative speed parameter is set according to the ignition timing IGLOG. The relative speed parameter corresponds to a difference between the reference value and the engine rotational speed. Thirdly, in this embodiment, the determination parameters (a first determination parameter MFPARAMA or a second determination parameter MFPARAMB) for performing the misfire determination are calculated with two methods, and the misfire determination is performed using one of the two determination parameters which is suitably selected according to the engine operating condition, or using both of the two determination parameters.

The calculation method of the modified rotational speed OMG is described first.

Since the torque TTSN generated by the torsion element is proportional to the rotation angle θ, the following dynamic equations (1) and (2) are obtained if a proportionality factor is expressed with "kTSN" and the torque TTSN is an only disturbance input. It is to be noted that the equations (1) and (2) are based on the assumption that the clutch 24 is completely engaged (with no slide). In the equation (1). ICRK is an inertia moment of the crankshaft 8 (and the parts which rotate with the crankshaft 8) and θCRK is a rotation angle of the crankshaft 8. The inertia moment ICRK is hereinafter referred to as "engine rotation moment ICRK". In the equation (2). IMAIN is an inertia moment of the main shaft 23 (and the parts which rotate with the main shaft 23), and θMAIN is a rotation angle of the main shaft 23. The inertia moment IMAIN is hereinafter referred to as "transmission rotation moment IMAIN".

$$ICRK\frac{d^2\theta CRK}{dt^2} = -kTSN \cdot \theta CRK = TTSN \tag{1}$$

$$IMAIN\frac{d^2\theta MAIN}{dt^2} = -kTSN \cdot \theta MAIN = -TTSN \tag{2}$$

The solutions of the equations (1) and (2) can be expressed by the following equations (3) and (4).

$$\theta CRK(t) = a1 \times \sin(\omega t + \phi) \tag{3}$$

$$\theta MAIN(t) = a2 \times \sin(\omega t + \phi) \tag{4}$$

The following equations (5) and (6) are obtained by applying the equations (3) and (4) respectively to the equations (1) and (2).

$$-ICRK \times a1 \times \omega^2 \times \sin(\omega t + \phi) = TTSN \tag{5}$$

$$-IMAIN \times a2 \times \omega^2 \times \sin(\omega t + \phi) = -TTSN \tag{6}$$

The relationship expressed by the following equation (7) is obtained from the equations (5) and (6).

$$a1 \times ICRK = -a2 \times IMAIN \tag{7}$$

The crank rotation angle θCRKOBS detected by the crank angle position sensor 10 and the transmission rotation angle θMAINOBS detected by the resolver 26 are respectively given by the following equations (8) and (9).

$$\theta CRKOBS = \theta CRKE + \theta CRKTSN \tag{8}$$

$$\theta MAINOBS = \theta MAINE + \theta MAINTSN \tag{9}$$

In the equations (8) and (9), θCRKE and θMAINE are respectively a crank rotation angle and a transmission rotation angle displaced by the output torque of the engine 1 (hereinafter referred to respectively as "engine torque crank rotation angle θCRKE" and "engine torque transmission rotation angle θMAINE"). Further, θCRKTSN and θMAINTSN are respectively a crank rotation angle and a transmission rotation angle displaced by the torque TTSN generated by the torsion element 21 (hereinafter referred to respectively as "torsion element torque crank rotation angle θCRKTSN" and "torsion element torque transmission rotation angle θMAINTSN").

The torsion element torque crank rotation angle θCRKTSN and the torsion element torque transmission rotation angle θMAINTSN are expressed by the following equations (10) and (11) when using the equations (3) and (4).

$$\theta CRKTSN(t) = a1 \times \sin(\omega t + \phi) \quad (10)$$

$$\theta MAINTSN(t) = a2 \times \sin(\omega t + \phi) \quad (11)$$

The following equation (12) is obtained from the equations (10) and (11).

$$\theta CRKTSN/\theta MAINTSN = a1/a2 \quad (12)$$

By applying the equation (7) to the equation (12), the following equation (13) is obtained.

$$\theta CRKTSN/\theta MAINTSN = -IMAIN/ICRK \quad (13)$$

On the other hand, the following equations (8a) and (9a) are obtained by modifying the equations (8) and (9). Accordingly, the following equation (14) is obtained by applying the equations (8a) and (9a) to the equation (13).

$$\theta CRKTSN = \theta CRKOBS - \theta CRKE \quad (8a)$$

$$\theta MAINTSN = \theta MAINOBS - \theta MAINE \quad (9a)$$

$$\frac{\theta CRKOBS - \theta CRKE}{\theta MAINOBS - \theta MAINE} = -\frac{IMAIN}{ICRK} \quad (14)$$

By employing the approximation that the torsion amounts of rotating elements other than the torsion element 21 such as the crankshaft 8, the main shaft 23, and the like, are negligible, the engine torque crank rotation angle θCRKE can be approximated to be substantially equal to the engine torque transmission rotation angle θMAIN (θCRKE≈θMAINE). Therefore, the equation (14) can be approximated by the following equation (14a).

$$\frac{\theta CRKOBS - \theta CRKE}{\theta MAINOBS - \theta CRKE} = -\frac{IMAIN}{ICRK} \quad (14a)$$

The following equation (15) is obtained by modifying the equation (14a), and the following equation (16) is obtained by differentiating the equation (15). In the equation (16). ωCRKOBS is a detected engine rotational speed and ωMAINOBS is a detected transmission rotational speed.

$$\theta CRKE = \frac{ICRK \cdot \theta CRKOBS + IMAIN \cdot \theta MAINOBS}{ICRK + IMAIN} \quad (15)$$

$$\omega CRKE = \frac{ICRK \cdot \omega CRKOBS + IMAIN \cdot \omega MAINOBS}{ICRK + IMAIN} \quad (16)$$

The rotational speed which should be used in the misfire determination is the engine torque crank rotational speed ωCRKE, which is referred to as "modified rotational speed OMG" in the following description. Further, the detected engine rotational speed ωCRKOBS and the detected transmission rotational speed ωMAINOBS are respectively referred to as "engine rotational speed OMGCRK" and "transmission rotational speed OMGMAIN" in the following description. If using these labels, the equation (16) is expressed with the following equation (17).

$$OMG = \frac{ICRK \times OMGCRK + IMAIN \times OMGMAIN}{ICRK + IMAIN} \quad (17)$$

Further, by defining an inertia moment ratio KRI with the following equation (18), the modified rotational speed OMG is given by the following equation (19).

$$KRI = ICRK/(ICRK + IMAIN) \quad (18)$$

$$OMG = KRI \times OMGCRK + (1 - KRI) \times OMGMAIN \quad (19)$$

By performing the misfire determination based on the modified rotational speed OMG calculated by the equation (19), the misfire determination can accurately be performed removing the influence of torsion of the torsion element 21.

Figure 2:
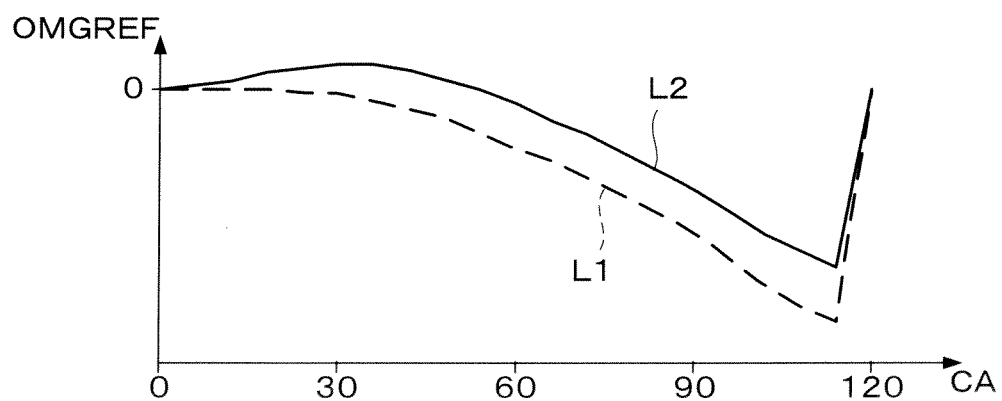
FIG. 2 is a time chart showing changes in a relative rotational speed (OMGREF) in the combustion stroke of the misfire cylinder.

FIG. 2 is a time chart showing changes in a relative rotational speed OMGREF upon occurrence of a misfire. The relative rotational speed OMGREF is obtained by using the engine rotational speed at the compression top dead center as a reference value (the horizontal axis indicates the crank angle CA). The broken line L1 corresponds to a state where the ignition timing IGLOG is not retarded, and the solid line L2 corresponds to a state where the ignition timing IGLOG is retarded from the compression top dead center. As shown in FIG. 2, the relative rotational speed OMGREF upon misfire occurrence increases when the ignition timing is retarded. Accordingly, the possibility of erroneous determination that the normal combustion is carried out becomes higher although the misfire has actually occurred.

Figure 3A:
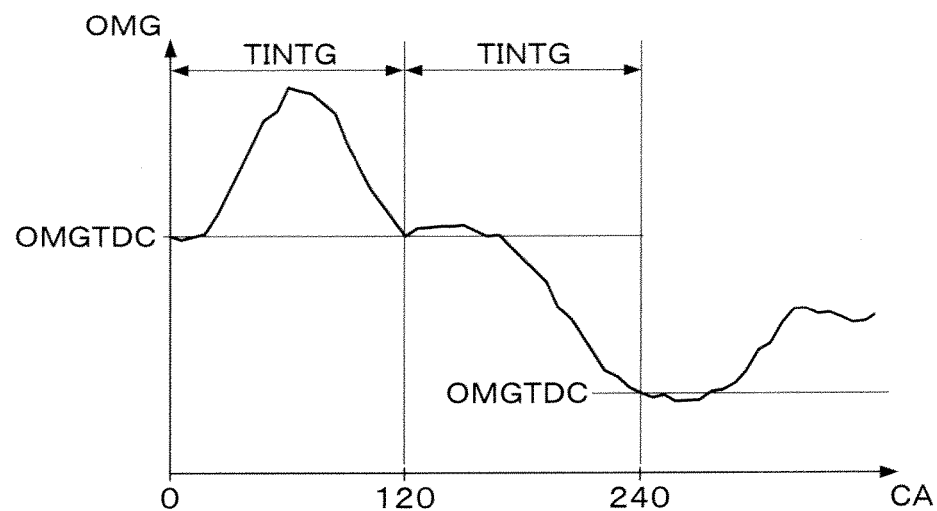
FIGS. 3A and 3B show time charts for illustrating the integration period (TINTG) in the embodiment.

FIG. 3A shows changes in the engine rotational speed OMG when a misfire occurs in the cylinder which is in the combustion stroke during a period from 120 degrees to 240 degrees of the crank angle CA, in the state where the ignition timing is retarded. In FIG. 3A, OMGTDC is a reference value of the engine rotational speed, and TINTG is an integration period which is set so as to coincide with the combustion stroke of each cylinder. It is indicated that the rotational speed OMG slightly increases in the starting portion (CA=120-150 degrees) of the combustion stroke of the misfire cylinder due to retarding the ignition timing.

Figure 3B:
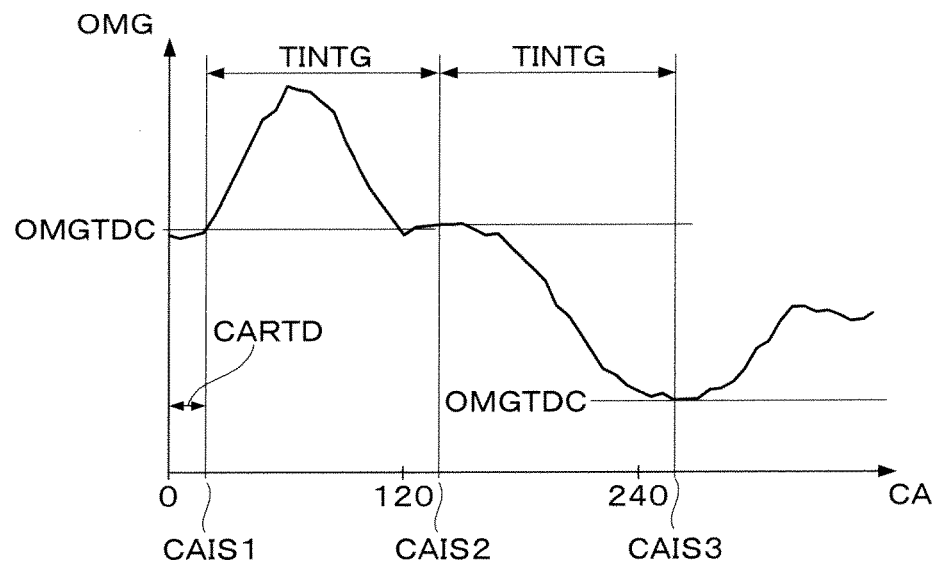

Therefore, in this embodiment, the start timing of the integration period for integrating a relative rotational speed OMGREF (=OMG−OMGTDC) is set, as indicated in FIG. 3B, to CAIS1 (=CARTD), CAIS2 (=120+CARTD), CAIS3 (=240+CARTD), . . . and the rotational speed reference value OMGTDC is set to a rotational speed at the start timing CAIS (hereinafter referred to as "ignition timing dependent correction"). CARTD indicated in FIG. 3B is a correction angle corresponding to the retard amount of the ignition timing IGLOG. In this embodiment, the time period parameter CRME is detected at intervals of 6 degrees of the crank angle. Accordingly, the ignition timing dependent correction is actually performed using an ignition timing index IGOFST which is obtained by digitizing the correction angle with the 6-degree period.

It is to be noted that the influence of torsion of the torsion element 21 is negligible ((OMG≈OMGCRK) in the examples shown in FIGS. 2, 3A, and 3B.

Figure 4:
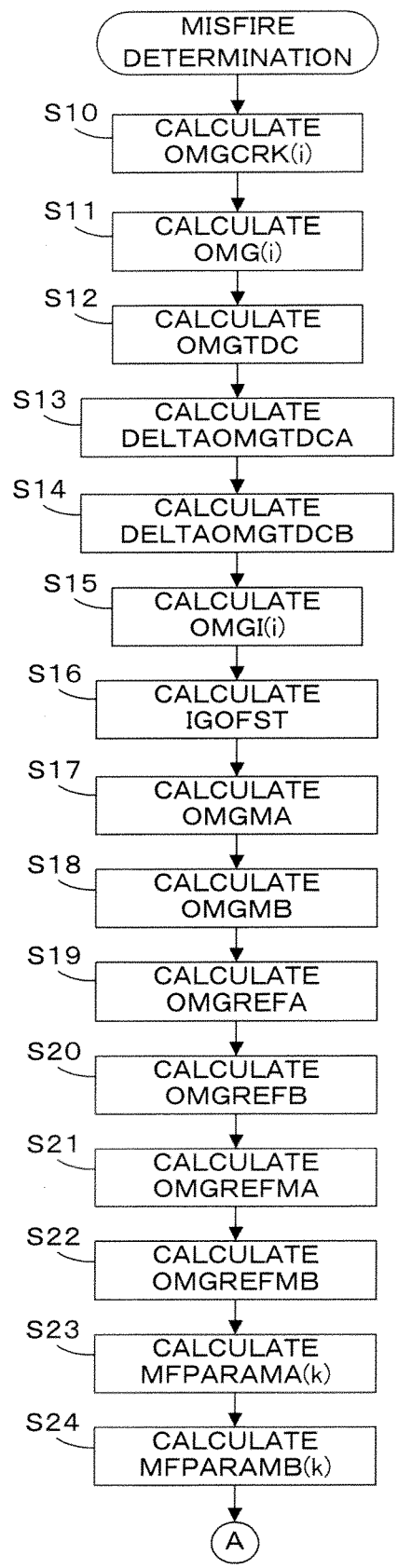
FIGS. 4 and 5 are flowcharts of a process for performing the misfire determination.
Figure 5:
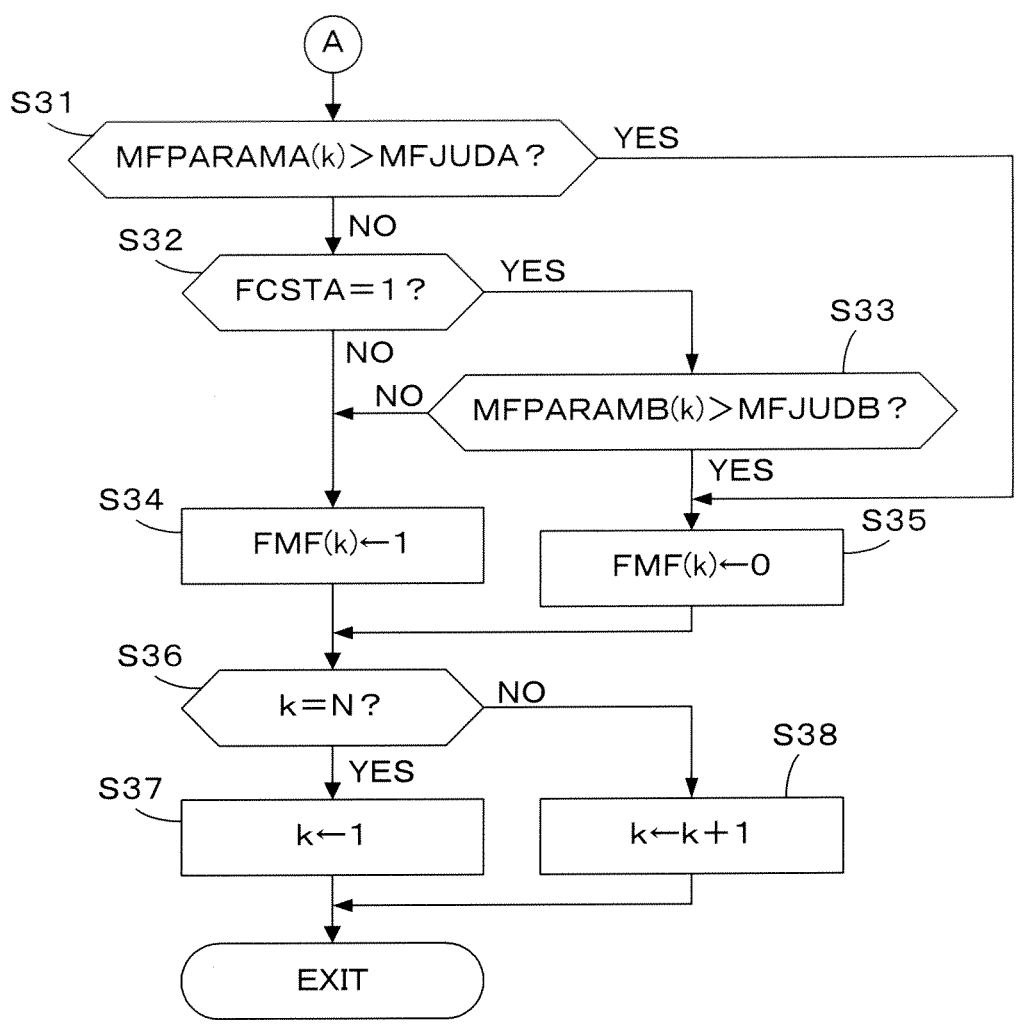

FIGS. 4 and 5 show a flowchart of a misfire determination process for performing the misfire determination based on the time period parameter CRME detected by the CRK sensor. The misfire determination process is executed by the CPU in the ECU 5 in synchronism with the TDC pulse generation. The time period parameter CRME(i), which is a time interval of the CRK pulse generated at every six degrees of the crank angle, is detected and the data of the detected time period parameter CRME(i) corresponding to an angular range of 1440 degrees of the crank angle (i=0-240) are stored in a buffer memory in the memory circuit. Further, if a cylinder discrimination number, which is numbered in the order of ignition, is expressed b>"k" (=1 to 6) and a number of data corresponding to one TDC period is expressed by "NTDC" (NTDC=20 in this embodiment), calculations in which the parameter "i" takes values from (k−1)NTDC to {kNTDC−1)+120} or calculations in which the parameter "i" takes values from {(k−1))NTDC+120} to {(kNTDC−1)+120} are performed by one execution of the process. For example, when the process performs the calculations corresponding to the first cylinder (k=1), the parameter "i" takes values from "0" to "19" or values from "120" to "139", and when the process performs the calculations corresponding to the third cylinder (k=3), the parameter "i" takes values from "40" to "59" or values from "160" to "179".

In step S10, the time period parameter CRME(i) is converted to the engine rotational speed OMGCRK(i) [rad/s] by the following equation (21).

$$OMGCRK(i)=D\theta/CRME(i) \quad (21)$$

where Dθ is an angular interval 720/ND [degrees] of measuring the time period parameter CRME. Dθ is equal to "π/30" [rad] in this embodiment.

In step S11, the engine rotational speed OMGCRK(i) is applied to the following equation (22) to calculate the modified rotational speed OMG(i). The equation (22) is substantially identical with the equation (19) shown above.

$$OMG(i)=KRI \times OMGCRK(i)+(1-KRI) \times OMGMAIN(i) \quad (22)$$

In step S12, a top dead center rotational speed OMGTDC is set to the modified rotational speed OMG at the time the piston of the cylinder subjected to the determination is positioned at the compression top dead center. Specifically, the top dead center rotational speed OMGTDC is set to OMG{(k−1)NTDC} or OMG{(k−1)NTDC+120}.

Figure 6:
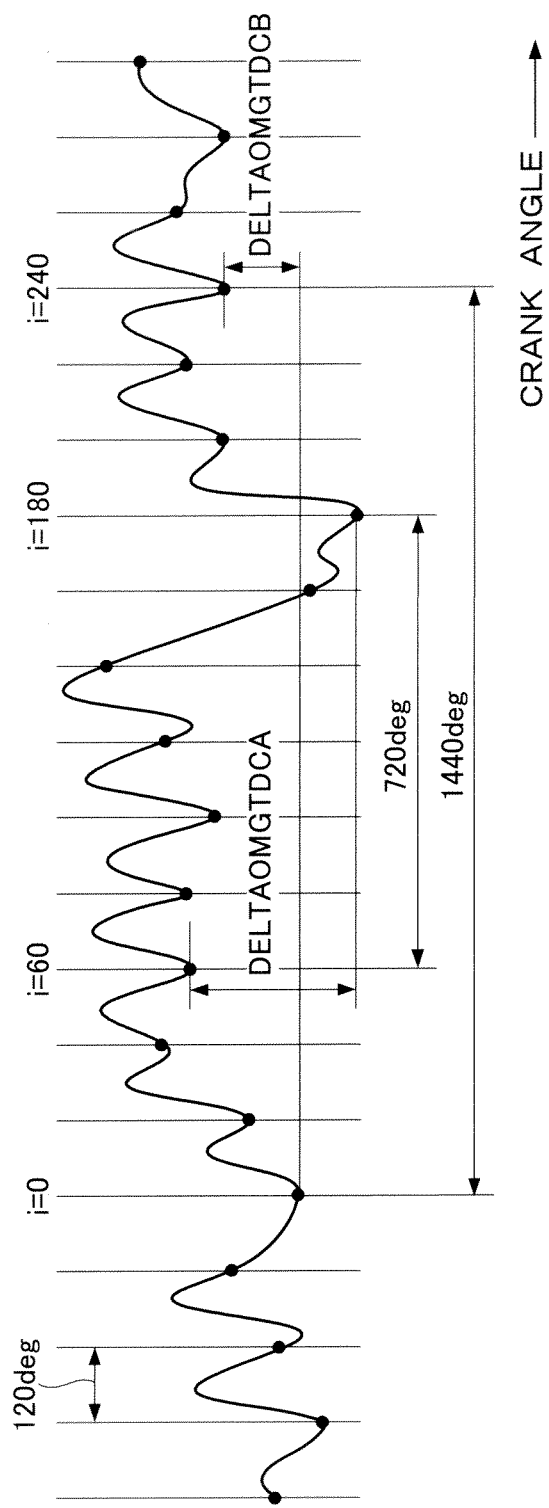
FIG. 6 is a time chart for illustrating the process of FIGS. 4 and 5.

In step S13, a change amount DELTAOMGTDCA of the modified rotational speed OMG(i) in the period of 720 degrees of the crank angle is calculated by the following equation (23) (DELTAOMGTDCA is hereinafter referred to as "first change amount"). The first change amount DELTAOMGTDCA is calculated as a speed change amount in the 720-degree period which is located at the center of the 1440-degree crank angle period, as shown in FIG. 6.

$$DELTAOMGTDCA=OMG(180)-OMG(60) \quad (23)$$

In step S14, a change amount DELTAOMGTDCB of the modified rotational speed OMG(i) in the period of 1440 degrees of the crank angle is calculated by the following equation (3) (refer to FIG. 6) (DELTAOMGTDCB is hereinafter referred to as "second change amount").

$$DELTAOMGTDCB=OMG(240)-OMG(0) \quad (24)$$

In step S15, the top dead center rotational speed OMGTDC is applied to the following equation (25) to calculate an inertial force rotational speed OMGI(i). The inertial force rotational speed OMGI(i) is a parameter indicative of the speed changing component which is inevitably generated by rotation of the engine 1, and is calculated according to a total mass of reciprocating parts (pistons and connecting rods) of the engine 1, a length of the connecting rod, a crank radius, and an inertia moment of the rotating parts driven by the engine 1, such as a crank pulley, a torque converter, and a lockup clutch. "K" in the equation (25) is a constant set to a predetermined value, and the inertia moment I is previously calculated according to the engine specification. FCR(i) is a combustion correlation function for eliminating the influence of disturbance, and given by the following equation (26) in this embodiment. It is to be noted that the specific calculation method of the inertial force rotational speed OMGI(i) is disclosed in Japanese Patent Laid-open No. 2007-198368 described above. "N" in the equation (26) is a number of cylinders, which is "6" in this embodiment.

$$OMGI(i)=K \times OMGTDC \times (-2) \times FCR(i)/3I \quad (25)$$

$$FCR(i)=\{1-\cos(N \cdot D\theta \cdot i/2)\}/2 \quad (26)$$

Figure 7:
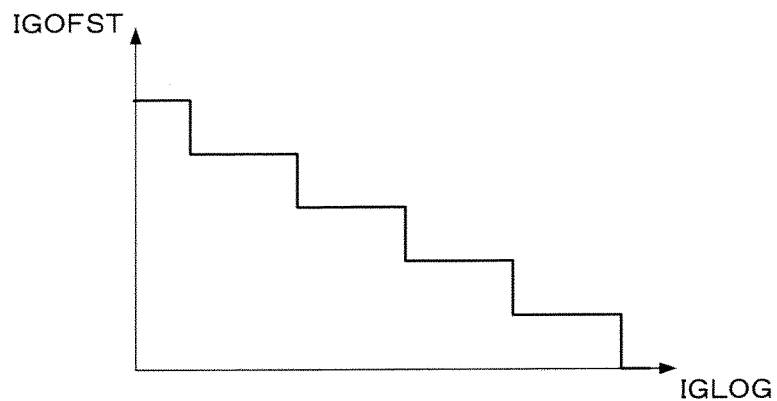
FIG. 7 shows a table referred to in the process of FIG. 4.

In step S16, an IGOFST table shown in FIG. 7 is retrieved according to the ignition timing IGLOG (which is defined by an advance amount from the crank angle position corresponding to the compression top dead center), to calculate an ignition timing index IGOFST. The IGOFST table is set so that the ignition timing index IGOFST increases as the ignition timing IGLOG is further retarded (as the retard amount increases).

In step S17, a 720-degree filtering is performed with the following equation (27) to compensate the influence of the inertial force rotational speed OMGI(i) and to calculate a first corrected rotational speed OMGMA(i+IGOFST). The 720-degree filtering is defined as extracting a changing component over a comparatively short period by canceling a linearly changing component in one combustion cycle period. The 720-degree filtering is performed to eliminate a rotational speed changing component due to a torque applied to the engine from a load on the engine (a torque applied from wheels of the vehicle and auxiliary components driven by the engine 1, a torque due to the friction of the sliding parts of the engine 1, or the like). If the index parameter i is equal to or greater than "120", the first corrected rotational speed OMGMA(i+IGOFST) is calculated with the following equation (27a).

$$OMGMA(i+IGOFST)=OMG(i+IGOFST)-DELTA OMGTDCA \times D\theta \times i/4\pi - OMGI(i) \quad (27)$$

$$OMGMA(i+IGOFST)=OMG(i+IGOFST)-DELTA OMGTDCA \times D\theta \times (i-120)/4\pi - OMGI(i) \quad (27a)$$

In step S18, a 1440-degree filtering is performed with the following equation (28) to compensate the influence of the inertial force rotational speed OMGI(i) and to calculate a second corrected rotational speed OMGMB(i+IGOFST). The second corrected rotational speed OMGMB(i+IGOFST) is applied, as described afterward, to the misfire determination in the warming-up idling operating condition immediately after the cold start of the engine 1.

$$OMGMB(i+IGOFST)=OMG(i+IGOFST)-DELTA OMGTDCB \times D\theta \times i/8\pi - OMGI(i) \quad (28)$$

In step S19, a first relative rotational speed OMGREFA (i+IGOFST) is calculated by the following equation (29).

$$OMGREF(i+IGOFST)=OMGMA(i+IGOFST)-OMGMATDC \quad (29)$$

where OMGMATDC is a first reference rotational speed which corresponds to the first corrected rotational speed at a reference timing (=(k−1)NTDC+IGOFST or (k−1)NTDC+120+IGOFST) when the piston of the cylinder subjected to the determination is positioned at the compression top dead center (the top dead center from which the combustion stroke starts).

In step S20, a second relative rotational speed OMGREFB(i+IGOFST) is calculated by the following equation (30).

$$OMGREFB(i+IGOFST)=OMGMB(i+IGOFST)-OMGMBTDC \quad (30)$$

where OMGMBTDC is a second reference rotational speed and corresponds to the second corrected rotational speed at the reference timing (=(k−1)NTDC+IGOFST or (k−1)NTDC+120+IGOFST) when the piston of the cylinder subjected to the determination is positioned in the vicinity of the compression top dead center (the top dead center from which the combustion stroke starts).

In step S21 the first relative rotational speed OMGREFMA(i+IGOFST) calculated in step S19 and the combustion correlation function FCR(i) (the equation (26)) are applied to the following equation (31) to calculate a first modified relative rotational speed OMGREFMA(i+IGOFST).

$$OMGREFMA(i+IGOFST)=OMGREFA(i+IGOFST) \times FCR(i) \quad (31)$$

In step S22, the second relative rotational speed OMGREFMB(i+IGOFST) calculated in step S20 and the combustion correlation function FCR (i) are applied to the following equation (32) to calculate a second modified relative rotational speed OMGREFMB(i+IGOFST).

$$OMGREFMB(i+IGOFST)=OMGREFB(i+IGOFST) \times FCR(i) \quad (32)$$

In step S23, the first modified relative rotational speed OMGREFMA(i+IGOFST) is applied to the following equation (33) or equation (33a) to calculate a first determination parameter MFPARAMA(k). The calculation for integrating the first modified relative rotational speed OMGREFMA(i+IGOFST) corresponding to the rotational speed OMG(i+IGOFST) detected during the integration period of the cylinder subjected to the misfire determination is performed by the equation (33) or (33a). The equation (33a) is used when the index parameter i takes a value which is equal to or greater than "120".

$$MFPARAMA(k) = \sum_{i=(k-1)NTDC}^{kNTDC-1} OMGREFMA(i+IGOFST) \quad (33)$$

$$MFPARAMA(k) = \sum_{i=(k-1+N)NTDC}^{(k+N)NTDC-1} OMGREFMA(i+IGOFST) \quad (33a)$$

In step S24, the second modified relative rotational speed OMGREFMB(i+IGOFST) is applied to the following equation (34) or equation (34a) to calculate a second determination parameter MFPARAMB(k). The calculation for integrating the second modified relative rotational speed OMGREFMB(i+IGOFST) corresponding to the rotational speed OMG(i+IGOFST) detected during the integration period of the cylinder subjected to the misfire determination is performed by the equation (34) or (34a). The equation (34a) is used when the index parameter i takes a value which is equal to or greater than "120".

$$MFPARAMB(k) = \sum_{i=(k-1+N)NTDC}^{(k+N)NTDC-1} OMGREFMB(i+IGOFST) \quad (34)$$

$$MFPARAMB(k) = \sum_{i=(k-1)NTDC}^{kNTDC-1} OMGREFMB(i+IGOFST) \quad (34a)$$

In next step S31 (FIG. 5), it is determined whether or not the first determination parameter MFPARAMA(k) is greater than a first determination threshold value MFJUDA (e.g., "0"). If the answer to step S31 is affirmative (YES), it is determined that the normal combustion has been performed, and a misfire flag FMF(k) is set to "0" (step S35). On the other hand, if the first determination parameter MFPARAMA(k) is equal to or less than MFJUDA, it is determined whether or not a warming-up operation flag FCSTA is "1" (step S32). The warming-up operation flag FCSTA is set to "1" when the engine 1 is in the warming-up idling operating condition immediately after the cold start.

If FCSTA is equal to "0" in step S32, i.e. the engine 1 is not in the warming-up idling operating condition, it is determined that a misfire has occurred in the cylinder corresponding to the cylinder identifying number k (k=1, 2, 3, 4, 5, and 6 respectively correspond to #1 cylinder. #5 cylinder, #3 cylinder, #6 cylinder. #2 cylinder, and #4 cylinder in this embodiment), and a misfire flag FMF(k) is set to "1" (step S34).

If FCSTA is equal to "1" in step S32, i.e., the engine 1 is in the warming-up idling operating condition, it is determined whether or not the second determination parameter MFPARAMB(k) is greater than a second determination threshold value MFJUDB (step S33). The second determination threshold value MFJUDB is set to a value which is less than the first determination threshold value MFJUDA. If the answer to step S33 is affirmative (YES), it determined that the normal combustion or the irregular combustion is performed. Thereafter, the process proceeds to step S35 described above. On the other hand, if MFPARAMB(k) is equal to or less than MFJUDB, it determined that a misfire has occurred in the cylinder corresponding to the cylinder identifying number k. Thereafter, the process proceeds to step S34 described above.

In step S36, it is determined whether or not the cylinder identifying number k is equal to the cylinder number N. If the answer to step S36 is negative (NO), the cylinder identifying number k is incremented by "1" (step S38). If k is equal to N, the cylinder identifying number k is returned to "1" (step S37).

Figure 8A:
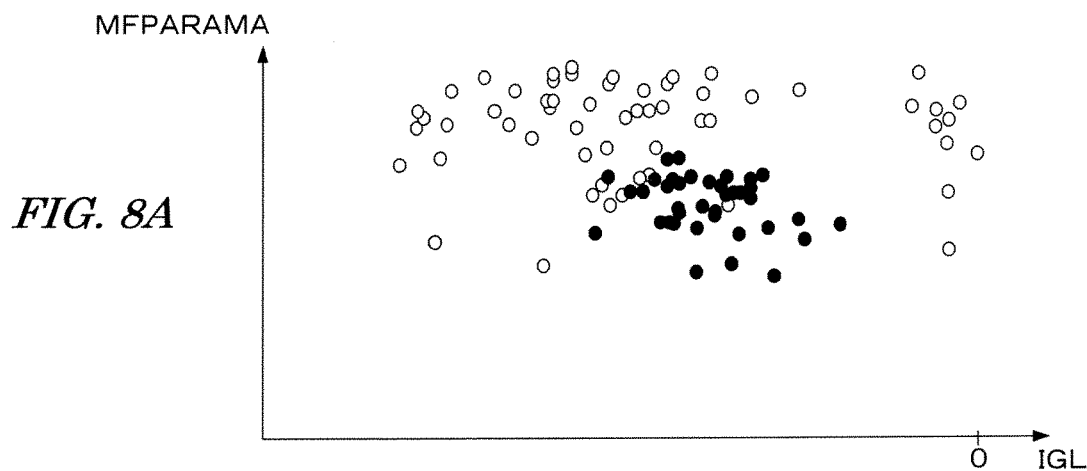
FIGS. 8A and 8B show graphs for illustrating the improvement effect regarding changes in the ignition timing.
Figure 8B:
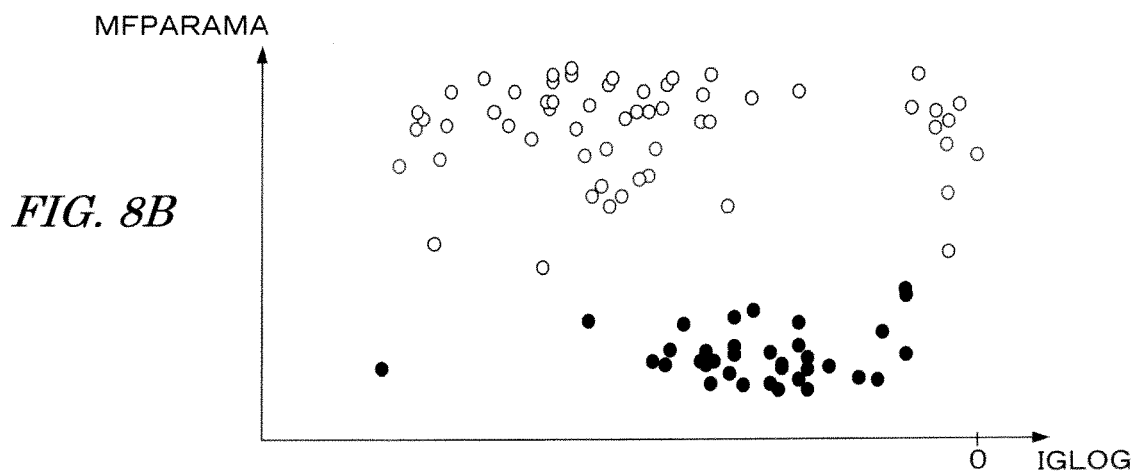

FIGS. 8A and 8B show measured data of the misfire determination parameter MFPARAMA when changing the ignition timing IGLOO in the retarding direction. FIG. 8A corresponds to an example where the ignition timing dependent correction with the ignition timing index IGOFST is not performed, and FIG. 8B corresponds to this embodiment in which the ignition timing dependent correction is performed. In FIGS. 8A and 8B, the white circles (○) correspond to the normal combustion (or the irregular combustion), and the black circles (●) correspond to the misfire. Referring to FIGS. 8A and 8B, the following point is confirmed: it is difficult to determine the misfire with sufficient accuracy when not performing the ignition timing dependent correction (FIG. 8A), but the misfire determination can accurately be performed by performing the ignition timing dependent correction.

As described above, according to the process of FIGS. 4 and 5, the first corrected rotational speed OMGMA is calculated by the 720-degree filtering, and the first relative rotational speed OMGREFA is calculated as a difference between the first corrected rotational speed OMGMA and the first reference rotational speed OMGMATDC corresponding to the first corrected rotational speed OMGMA at the reference timing. Further, the first modified relative rotational speed OMGREFMA is calculated by multiplying the first relative rotational speed OMGREFA with the combustion correlation function FCR, and the first determination parameter MFPARAMA(k) is calculated by integrating the first modified relative rotational speed OMGREFMA within the integration period TINTG. The misfire determination is performed according to the comparison result of the first determination parameter MFPARAMA and the first determination threshold value MFJUDA. Further, the ignition timing dependent correction is performed with respect to the reference timing and the start timing of the integration period TINTG. Accordingly, when the ignition timing is changed in the retarding direction, the value of the first determination parameter MFPARAMA upon misfire occurrence is prevented from approaching the value of the normal combustion, and the determination can accurately be performed regardless of changes in the ignition timing. In addition, by using the modified engine rotational speed OMG which is calculated in consideration of the influence of the torsion element 21, the misfire determination can accurately be performed removing the influence of the torsion element 21.

Further, the second corrected rotational speed OMGMB is calculated by the 1440-degree filtering, and the second relative rotational speed OMGREFB is calculated as a difference between the second correction rotational speed OMGMB and the second reference rotational speed OMGMBTDC. Further, the second modified relative rotational speed OMGREFMB is calculated by multiplying the second relative rotational speed OMGREFB with the combustion correlation function FCR, and the second determination parameter MFPARAMB(k) is calculated by integrating the second modified relative rotational speed OMGREFMB(i+IGOFST) within the integration period TINTG.

When the possibility of misfire occurrence is determined to be high by the first determination parameter MFPARAMA(k) and the engine 1 is in the warming-up idling operating condition immediately after the cold start, the misfire determination is performed by the second determination parameter MFPARAMB(k). The average change amount (DELTAOMGTDCB/8$\pi$) calculated using the second change amount DELTAOMGTDCB in the period of 1440 degrees of the crank angle which is longer than the period of 720 degrees of the crank angle, is hardly influenced by a sudden irregular combustion. Accordingly, the second corrected rotational speed OMGMB is hardly influenced by such irregular combustion with respect to the cylinders other than the cylinder in which the irregular combustion has abruptly occurred. Therefore, by using the second determination parameter MFPARAMB, the misfire determination can accurately be performed in the warming-up idling operating condition where the irregular combustion may easily occur. Further, in the operating condition other than the warming-up idling operating condition, by performing the misfire determination using the first determination parameter MFPARAMA, which is based on the first corrected rotational speed OMGMA(i+IGOFST) which is calculated according the average change amount (DELTAOMGTDCA/4$\pi$) calculated using the first change amount DELTAOMGTDCA in the 720-degree crank angle period, the misfire determination can accurately be performed, for example, in the transient operating condition of the engine 1.

Figure 9A:
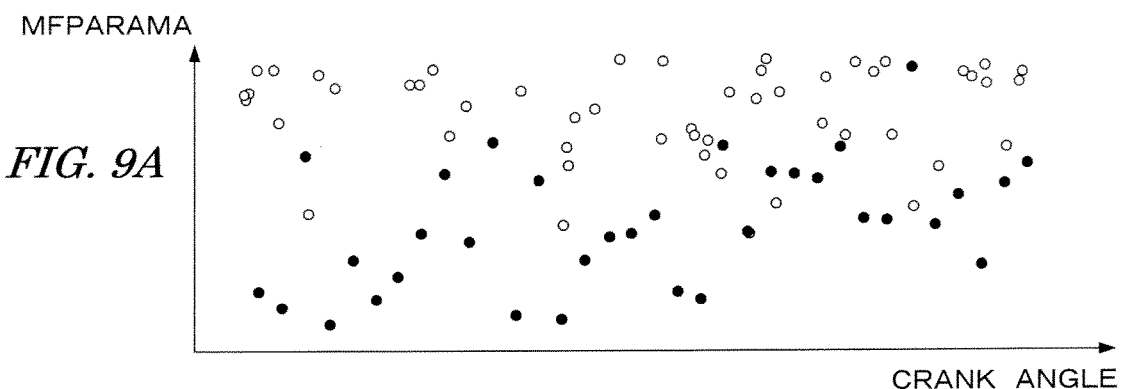
FIGS. 9A-9C are time charts for illustrating the improvement effect regarding abruptly-occurred irregular combustion.

FIG. 9A shows changes in the first determination parameter MFPARAMA calculated using the 720-degree filtering in the state (for example, an operating condition immediately after the cold start) where the irregular combustion and the misfire occur at random. In FIG. 9A, the black circles (●) indicate the values upon occurrence of the misfire, and the white circles (○) indicate the values upon occurrence of the irregular combustion. According to this figure, it is confirmed that it is difficult to determine the misfire distinguishing from the irregular combustion with the 720-degree filtering.

Figure 9B:
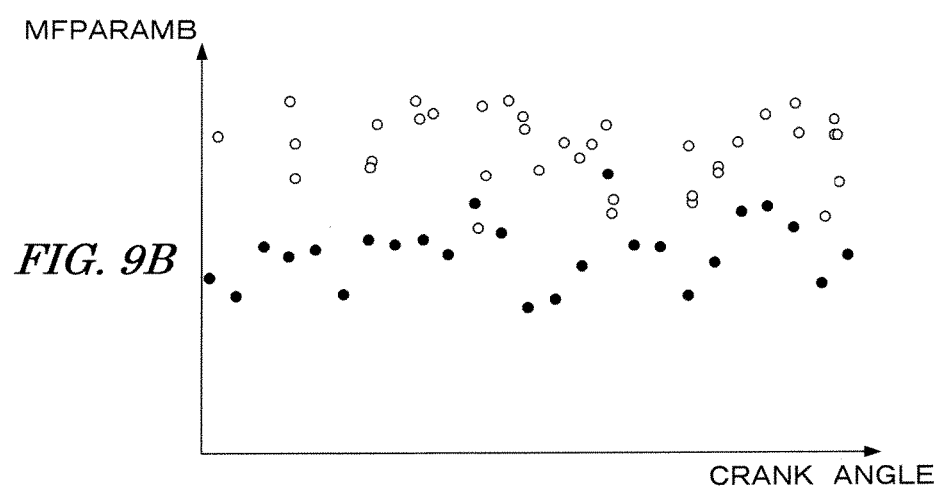

FIG. 9B shows changes in the second determination parameter MFPARAMB calculated by performing the 1440-degree filtering in the similar operating condition as FIG. 9A, and the black circles (●) indicate the values upon occurrence of the misfire, and the white circles (○) indicate the values upon occurrence of the irregular combustion. Although there are still some cases that the value upon occurrence of the misfire exceeds the value upon occurrence of the irregular combustion, it is confirmed that the situation is considerably improved compared with the first determination parameter MFPARAMA shown in FIG. 9A.

Figure 9C:
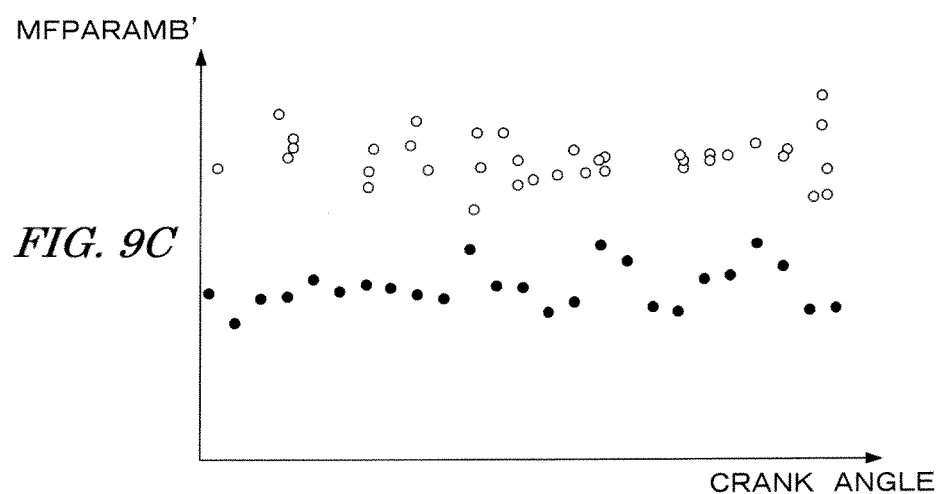

FIG. 9C shows changes in a second determination parameter MFPARAMB' which is obtained by making the second predetermined period longer, i.e., 2880 degrees. As apparent from FIG. 9C, the longer second predetermined period makes it possible to accurately determine the misfire distinguishing from the irregular combustion.

In this embodiment, the resolver 26 and the ECU 5 constitute the transmission rotational speed parameter detecting means, the crank angle position sensor 12 and the ECU 5 constitute the rotational speed parameter detecting means, and the ECU 5 constitutes the modifying means, the correcting means, the relative speed parameter calculating means, the determination parameter calculating means, and the determining means. Specifically, step S11 of FIG. 4 corresponds to the modifying means, steps S13. S14, S17, and S18 correspond to the correcting means, steps S19 and S20 correspond to the relative speed parameter calculating means, steps S23 and S24 correspond to the determination parameter calculating means, and steps S31-S35 of FIG. 5 correspond to the determining means.

Figure 10A:
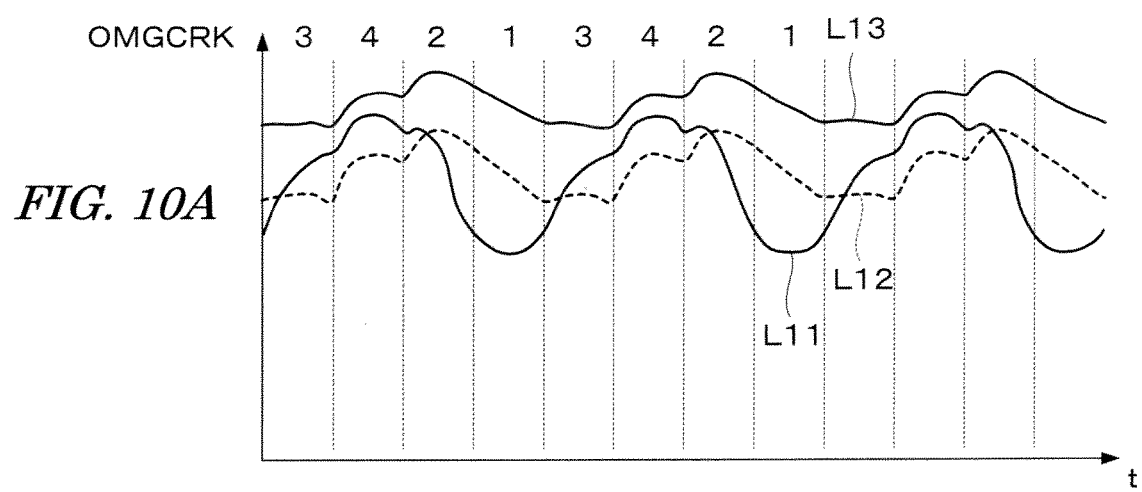
FIGS. 10A and 10B are time charts for illustrating the effect of the rotational speed modifying process for removing the influence of the torsion element disposed between the crankshaft and the transmission mechanism.
Figure 10B:
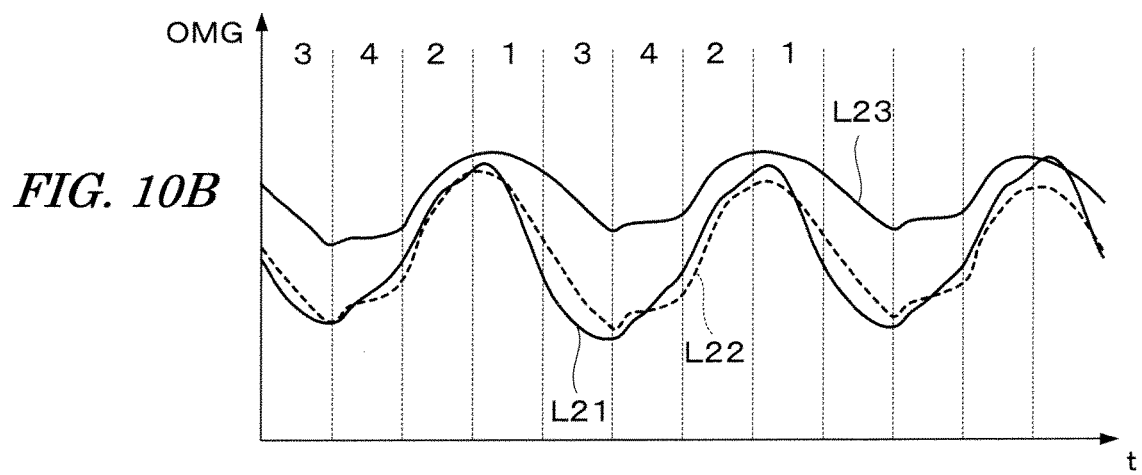
Figure 11:
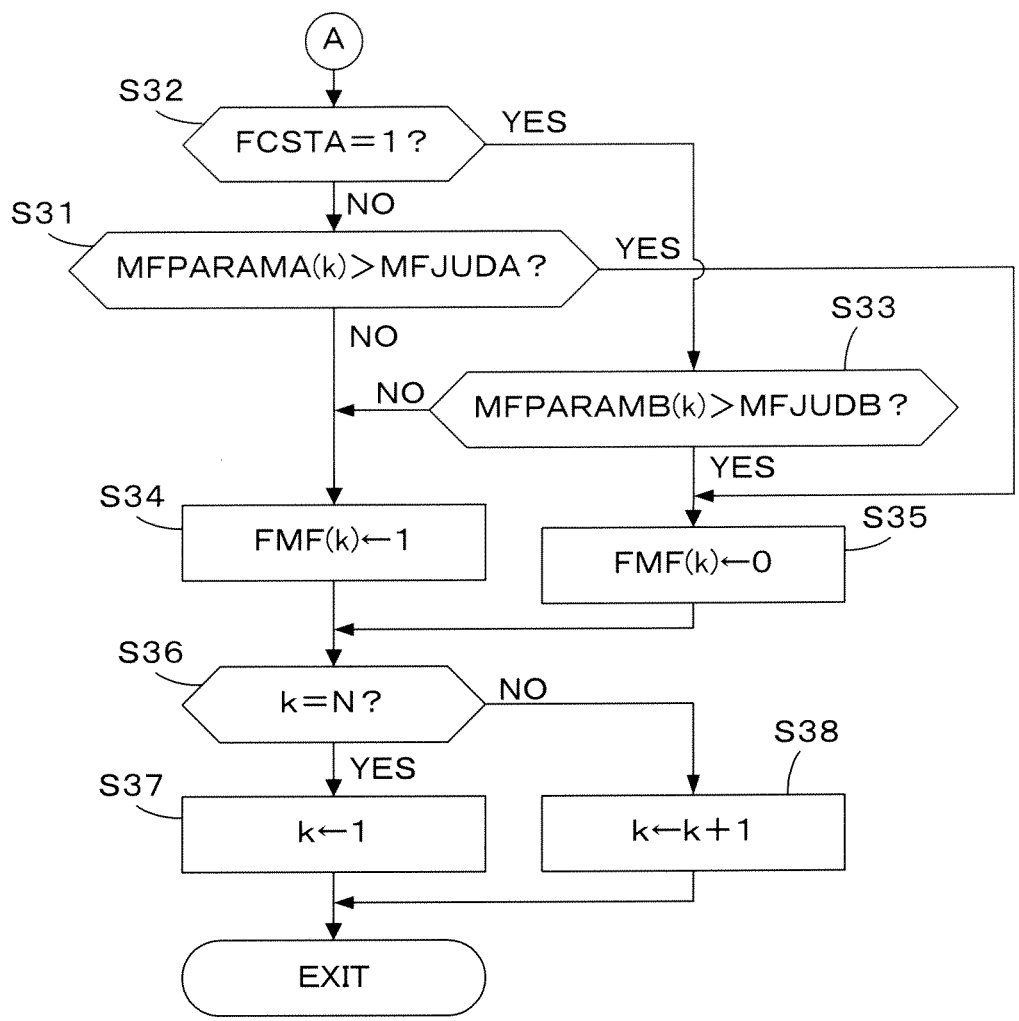
FIG. 11 is a flowchart of a modification of the process shown in FIG. 5.

FIGS. 10A and 10B show time charts for explaining the effect obtained by modifying the detected engine rotational speed OMGCRK with the equation (22), and these figures show actual measured data in the condition where a misfire occurred in #1 and #3 cylinders of a 4-cylinder engine. FIGS. 10A and 10B respectively show changes in the detected engine rotational speed OMGCRK and the modified rotational speed OMG, and the numbers indicated in the upper part of each figure are cylinder numbers corresponding to the combustion stroke of each cylinder. The curves L11, L12, and L13 shown in FIG. 10A correspond respectively to vehicle speeds VP1, VP2, and VP3 (VP1<VP2<VP3). The curves L21, L22, and L23 of FIG. 10B respectively show changes in the modified rotational speed OMG corresponding to the curves L11, L11, and L13.

The curves L12 and L13 indicate a tendency that the detected rotational speed OMGCRK decreases corresponding to the misfire cylinders (#1, #3). Accordingly, the misfire determination may be performed with the detected rotational speed OMGCRK. However, the curve L11 indicates that the detected rotational speed OMGCRK increases corresponding to the misfire cylinder #3 and decreases corresponding to the normal combustion cylinder #2, which means that the misfire determination cannot be performed accurately.

On the other hand, the modified rotational speed OMG shown by the curves L21, L22, and L23 decreases corresponding to the misfire cylinders #1 and #3, which makes it possible to accurately perform the misfire determination.

The present invention is not limited to the embodiment described above, and various modifications may be made. For example, in the above-described embodiment the modified rotational speed OMG is calculated using the equation (19). Alternatively, the following equation (41) may be used for calculating the modified rotational speed OMG. In the equation (41), OMGMAINAC is a parameter indicative of a changing component (alternating component) of the transmission rotational speed OMGMAIN, and is hereinafter referred to as "transmission rotational speed changing component".

$$OMG = OMGCRK + (IMAIN/ICRK) \times OMGMAINAC \quad (41)$$

The rotation change on the output side of the torsion element 21 is very small in the nonresonant state of the torsion element 21, and becomes very large in the resonant state of the torsion element 21. Therefore, the equation (41) is obtained as described below by regarding the rotation change on the output side of the torsion element 21 as a resonance affecting component which affects the input side of the torsion element 21.

If the torque on the input side of the torsion element 21 is indicated by a crankshaft torque TCRK and the torque on the output side of the torsion element 21 is indicated as a main shaft torque TMAIN, the following equation (42) is satisfied with the law of action and reaction.

$$TCRK = -TMAIN \quad (42)$$

Further, the torsion element torque rotational speed ωCRKTSN and the torsion element torque transmission rotational speed ωMAINTSN are respectively given by the following equations (43) and (44).

$$\omega CRKTSN = \int \frac{TCRK}{ICRK} dt \quad (43)$$

$$\omega MAINTSN = \int \frac{TMAIN}{IMAIN} dt \quad (44)$$

Since the crankshaft torque TCRK and the main shaft torque TMAIN have the equal absolute value, the relationship of the following equation (45) is satisfied.

$$|\omega CRKTSN| : |\omega MAINTSN| = IMAIN : ICRK \quad (45)$$

From the equations (42) and (45), the torsion element torque engine rotational speed ωCRKTSN can be expressed with the following equation (46).

$$\omega CRKTSN = -(IMAIN/ICRK) \times \omega MAINTSN \quad (46)$$

On the other hand, the engine torque crank rotational speed ωCRKE which should be applied to the misfire determination is obtained by subtracting the torsion element torque engine rotational speed ωCRKTSN indicative of the influence of the torsion element 21, from the detected engine rotational speed ωCRKOBS. That is, the engine torque crank rotational speed ωCRKE can be calculated by the following equation (47).

$$\omega CRKE = \omega CRKOBS - \omega CRKTSN \quad (47)$$

By applying the equation (46) to the equation (47), the following equation (48) is obtained.

$$\omega CRKE = \omega CRKOBS + \frac{IMAIN}{ICRK} \cdot \omega MAINTSN \quad (48)$$

The torsion element torque transmission rotational speed ωMAINTSN in the equation (48) can be approximated with a parameter indicative of a changing component in the transmission rotational speed ωMAINOBS, i.e., the transmission rotational speed changing component ωMAINOBSAC. Accordingly, the above-described equation (41) is obtained by expressing CRKE, ωCRKOBS, and ωMAINOBSAC with OMG, OMGCRK, and OMGMAINAC, respectively.

The transmission rotational speed changing component ωMAINOBSAC is calculated by the following equation (49).

$$\omega MAINOBSAC = \omega MAINOBS - \omega MAINOBSDC \quad (49)$$

In the equation (49), ωMAINOBSDC is a direct-current component of the transmission rotational speed ωMAINOBS. It is to be noted that the direct-current component ωMAINOBSDC contains a slowly-changing component whose changing rate is small compared with the changing component ωMAINOBSAC. In this embodiment, the direct-current component ωMAINOBSDC is calculated as a moving average value in the period of the latest one combustion cycle (a 720-degree period of the crank angle).

According to this modification, the modified rotational speed OMG, from which the influence of the torsion element 21 is removed, can be obtained with a comparatively easy calculation like the method of using the equation (19).

Further, in the above-described embodiment, the time period parameter CRME is converted to the engine rotational speed OMGCRK to perform the misfire determination. Alternatively, the misfire determination may be performed using the time period parameter CRME itself as the rotational speed parameter, as shown in Japanese Patent Laid-open No. 2007-198368. Similarly, a time-period parameter which is proportional to a reciprocal of the transmission rotational speed OMGMAIN may be used as the transmission rotational speed parameter, to calculate the modified engine rotational speed parameter.

Further in the above-described embodiment, the transmission rotational speed OMGMAIN is detected by the resolver 26. Alternatively, a sensor for detecting a rotational speed of the main shaft 23 may be provided additionally.

Further, in the above-described embodiment, the determination is performed using the second determination parameter MFPARAMB in the warming-up operating condition immediately after the cold start of the engine 1. Alternatively, the determination using the second determination parameter MFPARAMB may be performed in the operating condition where the air-fuel ratio is, in the idling operating condition of the engine 1, set to a value which is leaner than the stoichiometric ratio to perform the lean burn operation.

Further, the process shown in FIG. 5 may be modified as shown in FIG. 10. In FIG. 10, it is at first determined whether or not the warming-up operation flag FCSTA is "1" (step S32). If FCSTA is equal to "0", the determination using the first determination parameter MFPARAMA(k) is performed (step S31). If FCSTA is equal to "1", the determination using the second determination parameter MFPARAMB(k) is performed (step S33).

Further, in the above-described embodiment, the determination parameters MFPARAMA and MFPARAMB are calculated by integrating the modified relative rotational speeds OMGREFMA and OMGREFMB which are obtained by modifying the relative rotational speeds OMGREFA and OMGREFB with the combustion correlation function FCR. Alternatively, the determination parameters MFPARAMA and MFPARAMB may be calculated by integrating the relative rotational speeds OMGREFA and OMGREFB which are not modified with the combustion correlation function FCR. In this case, FCR(i) of the equation (25) for calculating the inertial force rotational speed OMGI(i) is set to a constant value (for example, "1").

Further, in the above-described embodiments, the example in which the present invention is applied to the 6-cylinder engine, is shown. The present invention is applicable to an engine having any number of cylinders. Further, the present invention is also applicable to the misfire determination for a gasoline engine in which fuel is directly injected into the combustion chamber. Further, the present invention is also applicable to the misfire determination for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A misfire detecting apparatus for an internal combustion engine, having engine rotational speed parameter detecting means for detecting an engine rotational speed parameter indicative of a rotational speed of said engine of which an output shaft is connected via a torsion element to an input shaft of a transmission mechanism, and detecting a misfire of said engine based on the detected engine rotational speed parameter, said misfire detecting apparatus comprising:

transmission rotational speed parameter detecting means for detecting a transmission rotational speed parameter indicative of a rotational speed of said input shaft of said transmission mechanism;

modifying means for calculating a modified engine rotational speed parameter by modifying the detected engine rotational speed parameter based on the transmission rotational speed parameter, an engine rotation moment on the input side of said torsion element, and a transmission rotation moment on the output side of said torsion element;

correcting means for calculating, at predetermined crank angles, an average change amount of the modified rotational speed parameter in a predetermined period, and an inertia speed changing component which is generated with rotation of said engine, and further calculating a corrected rotational speed parameter by correcting the modified rotational speed parameter according to the average change amount and the inertia speed changing component;

relative speed parameter calculating means for calculating a relative speed parameter according to a difference between a reference value and the corrected rotational speed parameter, the reference value being the corrected rotational speed parameter corresponding to the rotational speed parameter which is detected at a reference timing at which a piston of a cylinder, which is subjected to the misfire determination, is positioned in the vicinity of the compression top dead center;

determination parameter calculating means for calculating a determination parameter by integrating the relative speed parameter for an integration period corresponding to 720/N degrees of the crank angle ("N" is a number of cylinders of said engine);

determining means for performing a misfire determination based on the determination parameter; and providing means for providing an indication of normal or abnormal combustion of the internal combustion engine based on the misfire determination, wherein the reference timing and a start timing of the integration period are set according to the ignition timing of said engine, and wherein said modifying means calculates the modified engine rotational speed parameter using the following equations (A) and (B):

$$OMG = KRI \times OMGCRK + (1 - KRI) \times OMGMAIN \quad (A)$$

$$KRI = ICRK/(ICRK + IMAIN) \quad (B)$$

where "OMG" is the modified engine rotational speed parameter, "OMGCRK" is the detected engine rotational speed parameter, "OMGMAIN" is the detected transmission rotational speed parameter, "KRI" is an inertia moment ratio given by the equation (B), "ICRK" is the engine rotation moment, and "IMAIN" is the transmission rotation moment.

2. A misfire detecting apparatus for an internal combustion engine, having engine rotational speed parameter detecting means for detecting an engine rotational speed parameter indicative of a rotational speed of said engine of which an output shaft is connected via a torsion element to an input shaft of a transmission mechanism, and detecting a misfire of said engine based on the detected engine rotational speed parameter, said misfire detecting apparatus comprising:

transmission rotational speed parameter detecting means for detecting a transmission rotational speed parameter indicative of a rotational speed of said input shaft of said transmission mechanism;

modifying means for calculating a modified engine rotational speed parameter by modifying the detected engine rotational speed parameter based on the transmission rotational speed parameter, an engine rotation moment on the input side of said torsion element, and a transmission rotation moment on the output side of said torsion element;

correcting means for calculating, at predetermined crank angles, an average change amount of the modified rotational speed parameter in a predetermined period, and an inertia speed changing component which is generated with rotation of said engine, and further calculating a corrected rotational speed parameter by correcting the modified rotational speed parameter according to the average change amount and the inertia speed changing component;

relative speed parameter calculating means for calculating a relative speed parameter according to a difference between a reference value and the corrected rotational speed parameter, the reference value being the corrected rotational speed parameter corresponding to the rotational speed parameter which is detected at a reference timing at which a piston of a cylinder, which is subjected to the misfire determination, is positioned in the vicinity of the compression top dead center;

determination parameter calculating means for calculating a determination parameter by integrating the relative speed parameter for an integration period corresponding to 720/N degrees of the crank angle ("N" is a number of cylinders of said engine);

determining means for performing a misfire determination based on the determination parameter; and providing means for providing an indication of normal or abnormal combustion of the internal combustion engine based on the misfire determination, wherein the reference timing and a start timing of the integration period are set according to the ignition timing of said engine, and wherein said modifying means calculates the modified engine rotational speed parameter using the following equation (C):

$$OMG = OMGCRK + (IMAIN/ICRK) \times OMGMAINAC \quad (C)$$

where "OMG" is the modified engine rotational speed parameter, "OMGCRK" is the detected engine rotational speed parameter, "OMGMAINAC" is a changing component parameter indicative of a changing component contained in the detected transmission rotational speed parameter, "ICRK" is the engine rotation moment, and "IMAIN" is the transmission rotation moment.

3. A misfire detecting method for detecting a misfire of an internal combustion engine, of which the output shaft is connected via a torsion element to an input shaft of a transmission mechanism, said misfire detecting method comprising the steps of:

a) detecting an engine rotational speed parameter indicative of a rotational speed of said engine;

b) detecting a transmission rotational speed parameter indicative of a rotational speed of said input shaft of said transmission mechanism;

c) calculating a modified engine rotational speed parameter by modifying the detected engine rotational speed parameter based on the transmission rotational speed parameter, an engine rotation moment on the input side of said torsion element, and a transmission rotation moment on the output side of said torsion element;

d) calculating, at predetermined crank angles, an average change amount of the modified rotational speed parameter in a predetermined period, and an inertia speed changing component which is generated with rotation of said engine;

e) calculating a corrected rotational speed parameter by correcting the modified rotational speed parameter according to the average change amount and the inertia speed changing component;

f) calculating a relative speed parameter according to a difference between a reference value and the corrected rotational speed parameter, the reference value being the corrected rotational speed parameter corresponding to the rotational speed parameter which is detected at a reference timing at which a piston of a cylinder, which is subjected to the misfire determination, is positioned in the vicinity of the compression top dead center;

g) calculating a determination parameter by integrating the relative speed parameter for an integration period corresponding to 720/N degrees of the crank angle ("N" is a number of cylinders of said engine);

h) performing a misfire determination based on the determination parameter; and i) providing an indication of normal or abnormal combustion of the internal combustion engine based on the misfire determination, wherein the reference timing and a start timing of the integration period are set according to the ignition timing of said engine, and wherein the modified engine rotational speed parameter is calculated using the following equations (A) and (B):

$$OMG = KRI \times OMGCRK + (1 - KRI) \times OMGMAIN \quad (A)$$

$$KRI = ICRK/(ICRK + IMAIN) \quad (B)$$

where "OMG" is the modified engine rotational speed parameter, "OMGCRK" is the detected engine rotational speed parameter, "OMGMAIN" is the detected transmission rotational speed parameter, "KRI" is an inertia moment ratio given by the equation (B), "ICRK" is the engine rotation moment, and "IMAIN" is the transmission rotation moment.

* * * * *